United States Patent [19]

Ichikawa et al.

[11] 4,431,370

[45] Feb. 14, 1984

[54] MULTISTAGE HYDRAULIC MACHINES HAVING AIR EXHAUSTING DEVICES

[75] Inventors: Kentaro Ichikawa, Chigasaki; Ichiro Yamagata; Sachio Tsunoda, both of Yokohama, all of Japan

[73] Assignee: Tokyo Shibaura Denki Kabushiki Kaisha, Kanagawa, Japan

[21] Appl. No.: 316,357

[22] Filed: Oct. 29, 1981

[30] Foreign Application Priority Data

Nov. 7, 1980 [JP] Japan .................... 55-156812

[51] Int. Cl.³ ............................ F03B 15/04
[52] U.S. Cl. ...................... 415/112; 415/1; 415/500
[58] Field of Search ............ 415/112, 116, 1, 500, 415/175

[56] References Cited

U.S. PATENT DOCUMENTS

| | | | |
|---|---|---|---|
| 3,890,059 | 6/1975 | Takase | 415/1 |
| 4,170,435 | 10/1979 | Swearingen | 415/1 |
| 4,179,237 | 12/1979 | Ogiwara et al. | 415/1 |
| 4,295,781 | 10/1981 | Ogiwara et al. | 415/1 |

FOREIGN PATENT DOCUMENTS

| | | | |
|---|---|---|---|
| 279518 | 6/1969 | Austria . | |
| 829853 | 8/1938 | France | 415/175 |
| 54-114648 | 9/1979 | Japan | 415/1 |
| 2061413 | 5/1981 | United Kingdom | 415/175 |

Primary Examiner—Stephen Marcus
Assistant Examiner—Brian J. Bowman
Attorney, Agent, or Firm—Stevens, Davis, Miller & Mosher

[57] ABSTRACT

In a multistage hydraulic machine of the type having a main shaft supporting a plurality of runners ranging from a highest pressure stage to a lowest pressure stage, at least one set of adjustable wicket gates provided for the highest pressure stage runner, a draft tube connected to a lower end of the lowest pressure stage runner, and devices for supplying and exhausting compressed air into and out of the pressure stages upon closure of the wicket gates, there is provided an air exhausting device including an air exhausting passage opening in a runner-cone portion of the lowest pressure stage runner.

5 Claims, 7 Drawing Figures

MULTISTAGE HYDRAULIC MACHINES HAVING AIR EXHAUSTING DEVICES

BACKGROUND OF THE INVENTION

This invention relates to multistage hydraulic machines, and more particularly to an air exhausting device to be used in a multistage reversible pump-turbine having adjustable wicket gates.

In a case where a pump-turbine having a number of stages and return passages interconnecting these stages is started to be operated in a pumping mode of operation or in a synchronous condenser mode of operation, it is an ordinary practice to completely close wicket gates provided for the highest pressure stage of the pump-turbine, and to introduce compressed air into a chamber encasing the runner, thereby depressing the water level in the chamber for reducing the torque required for this mode of operation.

When the operation of the pump-turbine is transferred from the starting state to the actual pumping mode of operation, compressed air in the chamber is exhausted through an air exhausting system, while water is supplied from the draft tube of the pump-turbine to raise the water level in the chamber. Upon establishment of a predetermined water pressure (or priming pressure) at the delivery side of the pump-turbine, the wicket gates are opened thereby to initiate the pumping mode of operation.

In this case, however, the removal or exhaust of air from the lower pressure stage chamber connected with return passages is far more difficult than the removal of air from a chamber encasing the runner of a single stage pump-turbine or from the highest pressure stage of a multistage pump-turbine. Particularly, the removal of air from the lowest pressure stage of the multistage pump-turbine is most difficult, and an establishment of a technique overcoming such a difficulty has been urgently required.

SUMMARY OF THE INVENTION

A primary object of the present invention is to provide an air exhausting device for a multistage hydraulic machine, wherein the air remaining in a chamber encasing the low-pressure stage runner can be exhausted completely.

Another object of the invention is to provide an air exhausting device for a multistage hydraulic machine, wherein the air remaining in the chamber encasing the low-pressure stage runner can be exhausted effectively without retardation of exhausting air in the runner encasing chamber.

According to the present invention, there is provided a multistage hydraulic machine of a type comprising a number of pressure stages each including a runner, a main shaft supporting the runners ranging from a highest pressure stage to a lowest pressure stage in this order, a number of return passages each interconnecting an adjacent pair of the pressure stages, at least one set of adjustable wicket gates provided for the highest pressure stage runner, a draft tube connected beneath the lowest pressure stage, and means for supplying and exhausting compressed air into and out of the pressure stages upon closure of the adjustable wicket gates; characterized in that the machine further comprises an air exhausting device which includes an air exhausting passage opening in an air exhausting region formed in a runner-cone portion of the lowest pressure stage runner.

A draft cone may be provided within the draft tube for encircling the main shaft, and an air exhaust pipe may be provided, instead of the passage, internally of the draft cone for opening in the air exhausting region.

Alternatively, the passage may be provided through the main shaft so that the upper end thereof opens in the air exhausting region.

DESCRIPTION OF THE PREFERRED EMBODIMENT

For simplifying the description, the invention will now be described with respect to a two stage reversible pump-turbine shown in FIG. 1 which constitutes a first embodiment of the present invention. The two stage pump-turbine has a high-pressure stage and a low-pressure stage respectively including a high-pressure stage runner 2 and a low-pressure stage runner 3. The two runners 2 and 3 are mounted on a main shaft 1 of the pump-turbine in a spaced apart relation, the high-pressure stage runner 2 being located upwardly. The high-pressure stage runner 2 is encased in a chamber 6 defined by an upper cover 4 and a lower cover 5, while the low-pressure stage runner 3 is encased in another chamber 9 defined by another pair of upper and lower covers 7 and 8. The chambers 6 and 9, each constituting a portion of the water passage within the pump-turbine, are interconnected by so-called return passage 10 wherein the water passed through the high-pressure stage runner 2 flows firstly radially outwardly and then radially inwardly into the chamber 9 encasing the low-pressure stage runner 3. A plurality of stationary vanes 11 are provided in the discharge end portion of the return passage 10.

Where not specified, words such as outlet, inlet, discharge side, and the like are used hereinafter with respect to the turbine mode of operation of the pump-turbine.

A spiral casing 12 is provided outwardly of the chamber 6 encasing the high-pressure stage runner 2 so as to be communicated with the chamber 6. The inlet end of the spiral casing 12 is connected with a penstock (not shown) through an inlet valve (not shown).

A set of adjustable wicket gates 14 are provided for the inlet side of the high-pressure stage runner 2 while another set of adjustable wicket gates 15 are provided in the return passage 10 to surround the low-pressure stage runner 3. A wicket gate operating mechanism (not shown) is provided for each set of the wicket gates 14 and 15 to control the opening of the same.

The lower end of the chamber 9 encasing the low-pressure stage runner 3 is coupled with a draft tube 16 formed into a downwardly expanding conical configuration. The draft tube 16 is in turn coupled with an elbow 17 expanding downwardly and horizontally.

Figure 1:
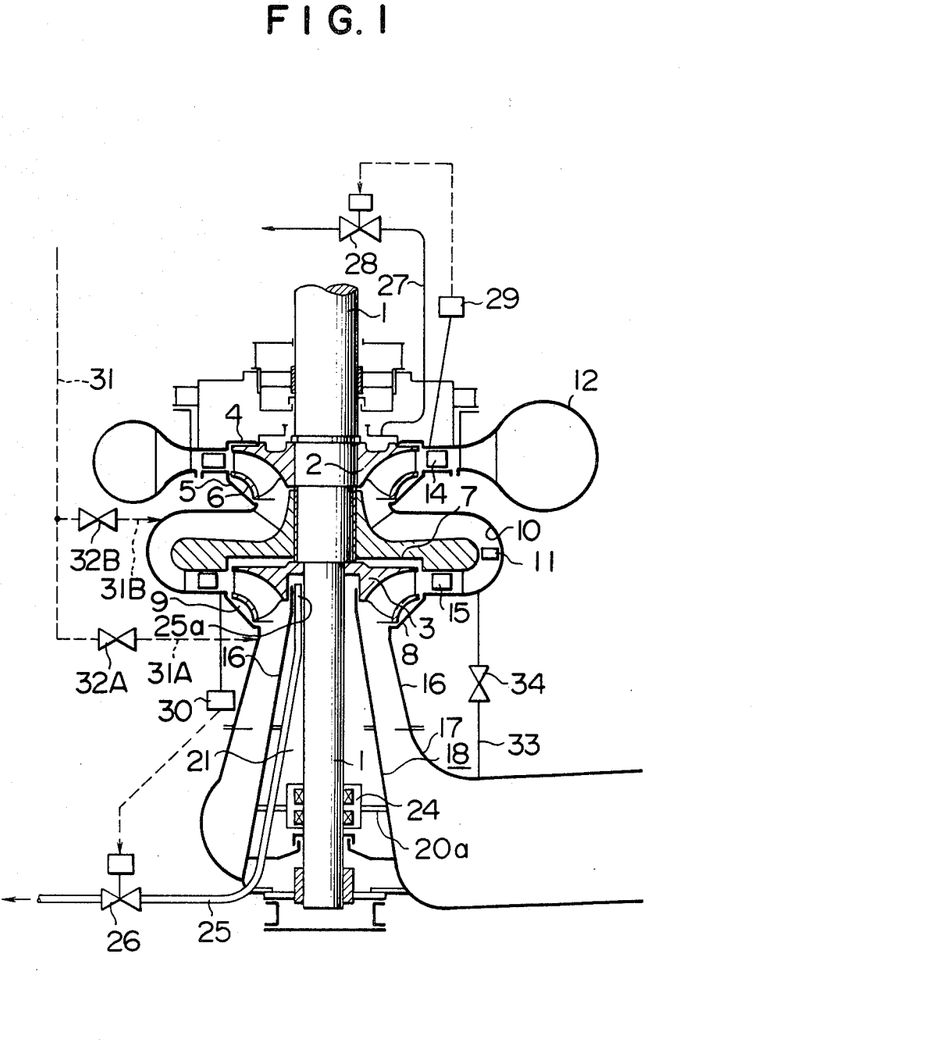
FIG. 1 is a vertical sectional view of a two-stage pump-turbine constituting a first embodiment of the present invention.
Figure 2:
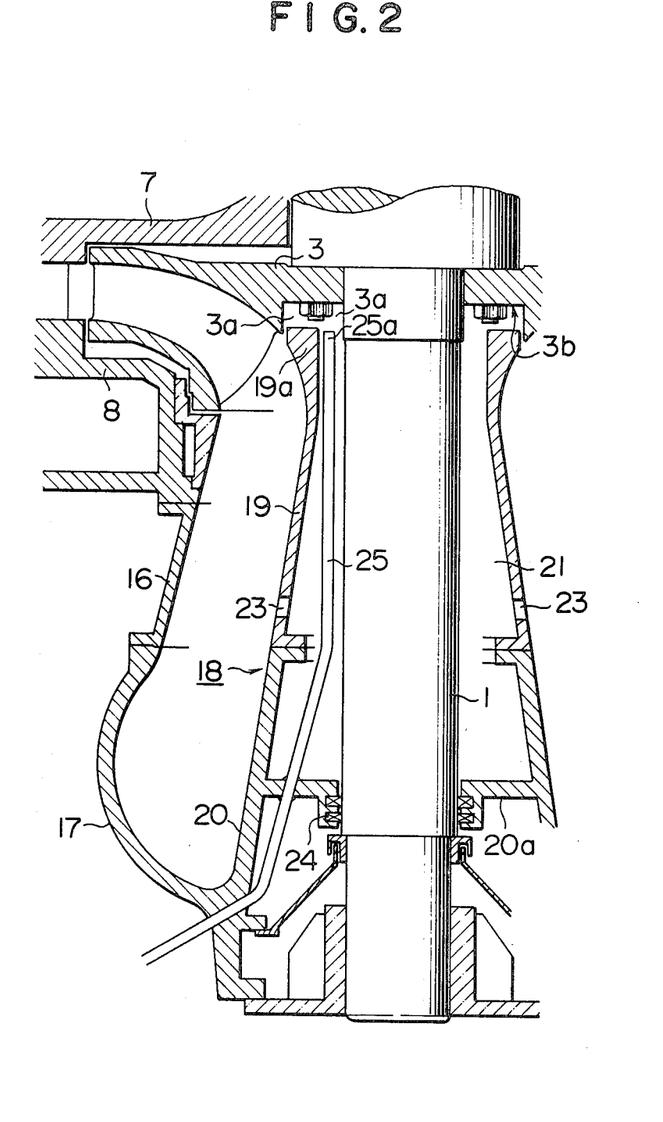
FIG. 2 is a vertical sectional view, in a much enlarged scale, of a portion of the first embodiment shown in FIG. 1, for indicating an air exhausting region formed in the pump-turbine.

According to the embodiment of the invention, shown in FIG. 1, a draft cone 18 expanding downwardly is provided internally of the draft tube 16 and the elbow 17. The draft cone 18 defines therein a space 21 through which the main shaft 1 extends in a coaxial relation. For convenience of manufacturing and assembling, the draft cone 18 is preferably divided into an upper cone member 19 and a lower cone member 20, as shown in FIG. 2.

In a runner-cone portion of the low-pressure stage runner 3 is provided an annular recess 3b opening downwardly around the main shaft 1. An upper end 19a of the upper cone member 19 extends into the annular recess 3b to an extent slightly above the uppermost portion of the discharge side edges (in turbine operation) of the low-pressure stage runner 3, so that the upper end 19a and the annular recess 3b in combination define an air exhausting region 3a.

The upper cone member 19 is further provided with a water draining hole 23 bored through a lower portion of the same, while the lower cone member 20 is provided with an annular bracket 20a for holding a shaft sealing device 24 at a desired position.

An air exhaust pipe 25 is extended internally of the draft cone 18, so that the upper end 25a of the pipe 25 projects upwardly from the cone 18 and opens in the air exhausting region 3a defined in the runner-cone portion of the runner 3. An air exhausting valve 26 is provided for the pipe 25.

Another air exhaust pipe 27 having an air exhausting valve 28 extends through the upper cover 4 of the chamber 6 encasing the high-pressure stage runner 2. Pressure-sensitive relays 29 and 30 are provided outside of the chambers 6 and 9 encasing the high-pressure stage runner 2 and the low-pressure stage runner 3, respectively. When the relays 29 and 30 detect the establishment of priming pressures during the pumping operation of the pump-turbine, the relays delivers output signals for closing the valves 28 and 26.

Compressed air supply lines 31A and 31B branched out of a source line 31 are connected to an upper part of the draft tube 16 and an intermediate portion of the return passage 10, respectively. The pipings 31A and 31B are provided with control valves 32A and 32B, respectively.

Furthermore, a water draining pipe 33 is extended between the return passage 10 and the elbow 17 for draining water in the return passage 10 directly into the elbow 17. A normally closed valve 34 is provided in the pipe 33.

In the turbine mode of operation of the pump-turbine shown in FIG. 1, pressurized water in the penstock flows into the spiral casing 12 and then through the adjustable wicket gates 14 into the chamber 6 encasing the high-pressure stage runner 2. The water discharged from the chamber 6 then flows through the return passage 10 and the stationary vanes 11 and the wicket gates 15 into the chamber 9 encasing the low-pressure stage runner 3.

On the other hand, in the pumping mode of operation wherein the runners are rotated in a direction reverse to that of the turbine mode of operation, the water pumped-up from the draft tube 16 is sent upwardly through the above described chambers, guide vanes, and else to the penstock.

Prior to the starting of the pumping operation, compressed air is introduced into the chambers 6 and 9 for purging water therein, and at the starting of the pumping operation, the chambers 6 and 9 are refilled with water while air is exhausted. More specifically, the wicket gates 14 and 15 on the output side of the runners 2 and 3 are closed completely. Then the valves 32A and 32B provided in the air supply pipes 31A and 31B are opened for supplying compressed air into the return passage 10 and the draft tube 16. During the above described operation, the air exhaust valves 26 and 28 are closed while the water draining (or drainage) valve 34 is opened. Thus, the water in the return passage 10 is drained through the water draining (or drainage) pipe 33 into the elbow 17. Simultaneously, the water in the draft tube 16 is drained directly into the elbow 17, and the water contained in an upper portion of the draft cone 18 is drained into the elbow 17 through the hole 23 provided through the lower portion of the upper cone 19.

Figure 3:
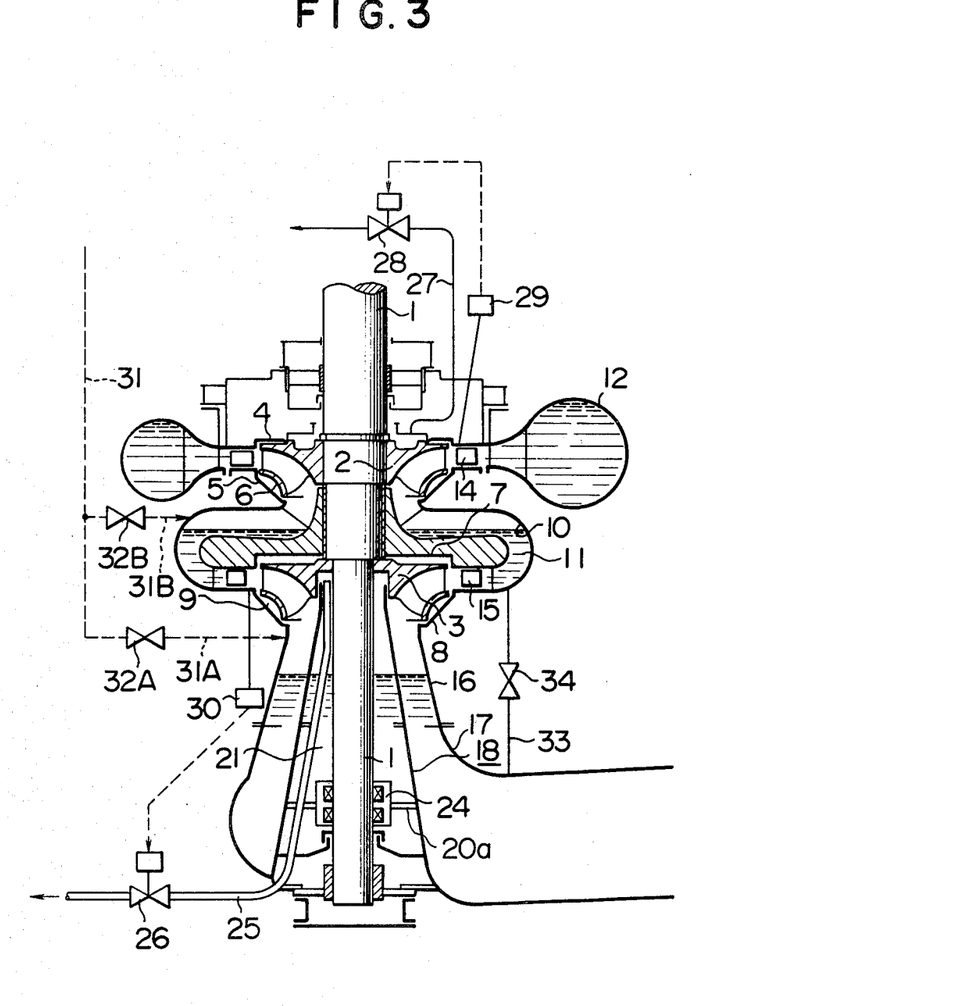
FIG. 3 is a vertical sectional view of the first embodiment wherein the water level in a runner chamber is depressed by compressed air.
Figure 4:
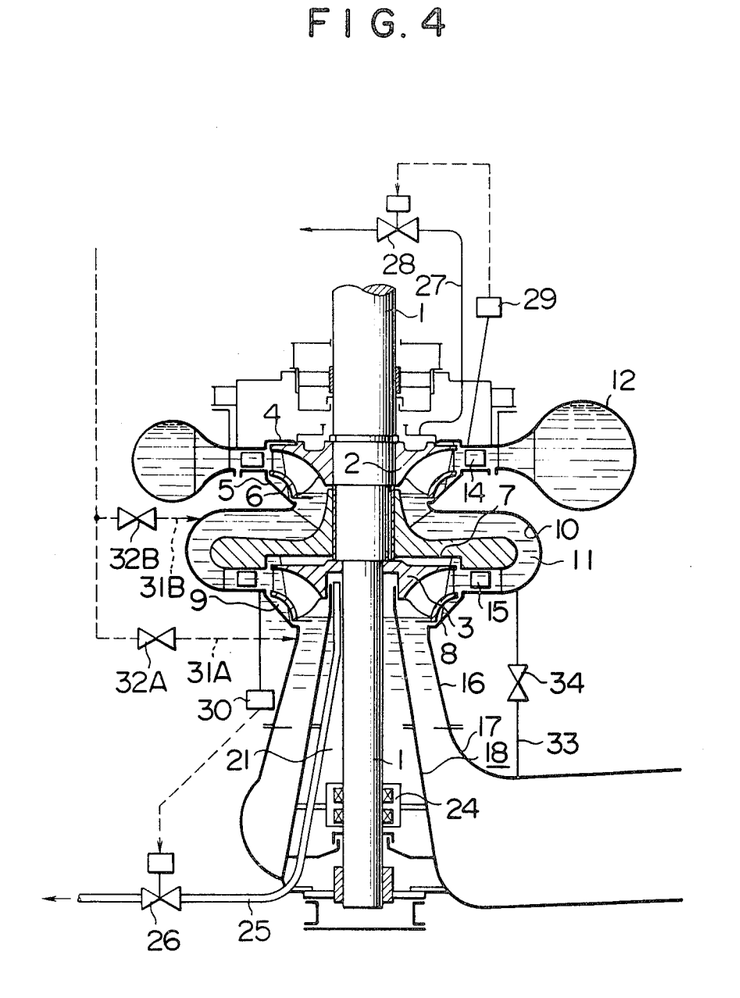
FIG. 4 is a vertical sectional view of the first embodiment wherein air in the chamber is being replaced by water.

When the state shown in FIG. 3 is attained, the air supply valves 32A and 32B are closed, and the high-pressure stage runner 2 and the low-pressure stage runner 3 are rotated in the pumping direction within the compressed air. As the rotating speed of the runners goes up to a value synchronous with a power system which supplies power to the pump-turbine, the air exhaust valves 28 and 26 are opened for exhausting air from the chambers 6 and 9 through the air exhaust pipes 25 and 27. When the water levels in the return passage 10 and the draft tube 16 are raised beyond the lower most edges of the runners 2 and 3, water caught by the same edges of the runners is forced outwardly and upwardly of the runners 2 and 3 by centrifugal force, thereby starting to fill the chambers 6 and 9 beginning with the peripheral portions as shown in FIG. 4. When water completely fills the chambers 6 and 9 encasing the runners 2 and 3, and the pressure relays 29 and 30 detect the establishment of priming pressures at the peripheral portions of the runners 2 and 3, the relays 29 and 30 deliver signals to close the air exhausting valves 28 and 26, respectively. The water draining (or drainage) valve 34 is also closed by either or both of the relays 29 and 30. After confirmation of closures of the valves 26, 28 and 34 by suitable device, not shown, firstly the wicket gates 15 for the low-pressure stage runner 3 and then the wicket gates 14 for the high-pressure stage runner 2 are automatically opened so that the pump-turbine enters into the normal operation of the pumping mode.

Figure 5:
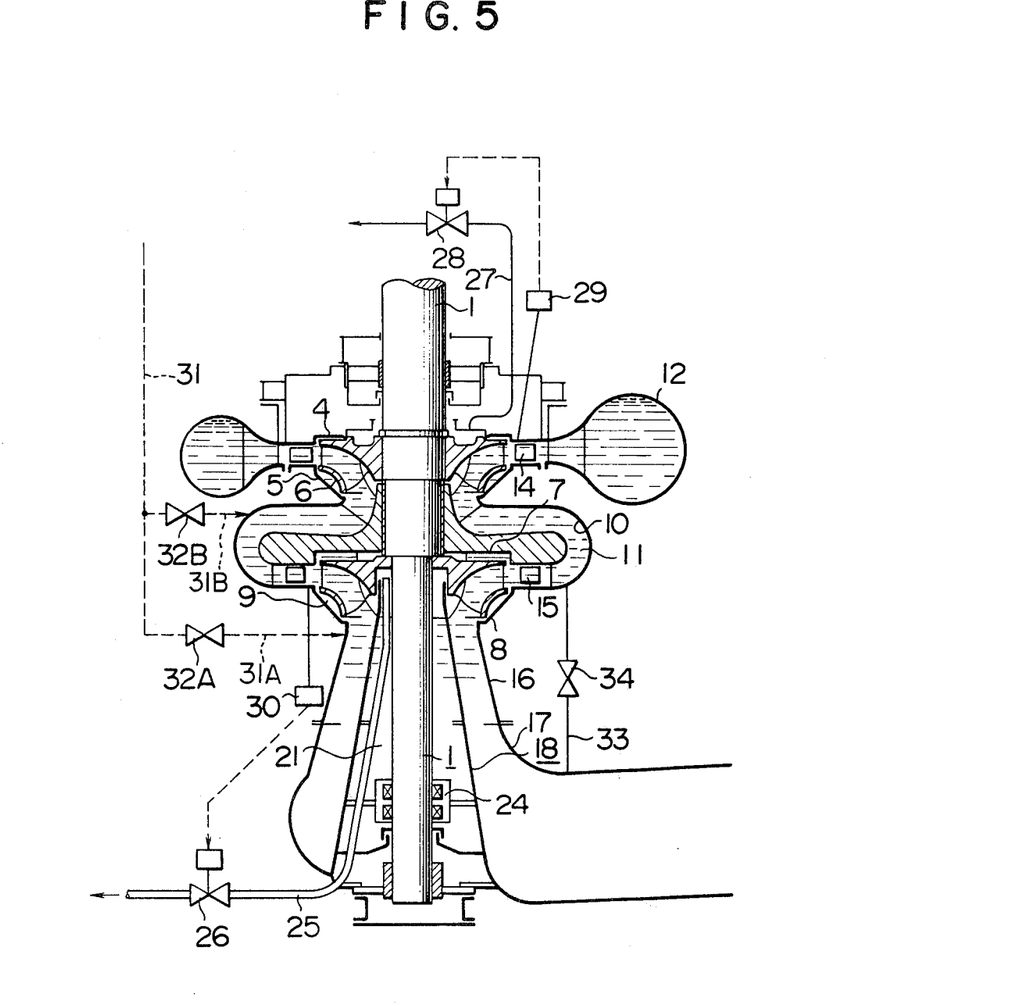
FIG. 5 is a vertical sectional view of the first embodiment showing the last stage of the air exhausting and water filling operation.

However, during the above described air exhausting operation, there is a tendency of air to stay in the upper internal portions of the chambers 6 and 9 as shown in FIG. 5. According to this invention, the air staying in the upper internal portion of the chamber 9 encasing the low-pressure stage runner 3 can be exhausted through the air exhaust pipe 25 opening in the air exhausting region 3a formed in the runner-cone portion of the runner 3. Furthermore, since the draft cone 18 is provided to separate the main shaft 1 rotating at a highspeed from the interior of the draft tube 16, the occurrence of a cavitation or a water pressure pulsation can be substantially prevented even in a turbine mode of operation under a partial load.

Figure 6:
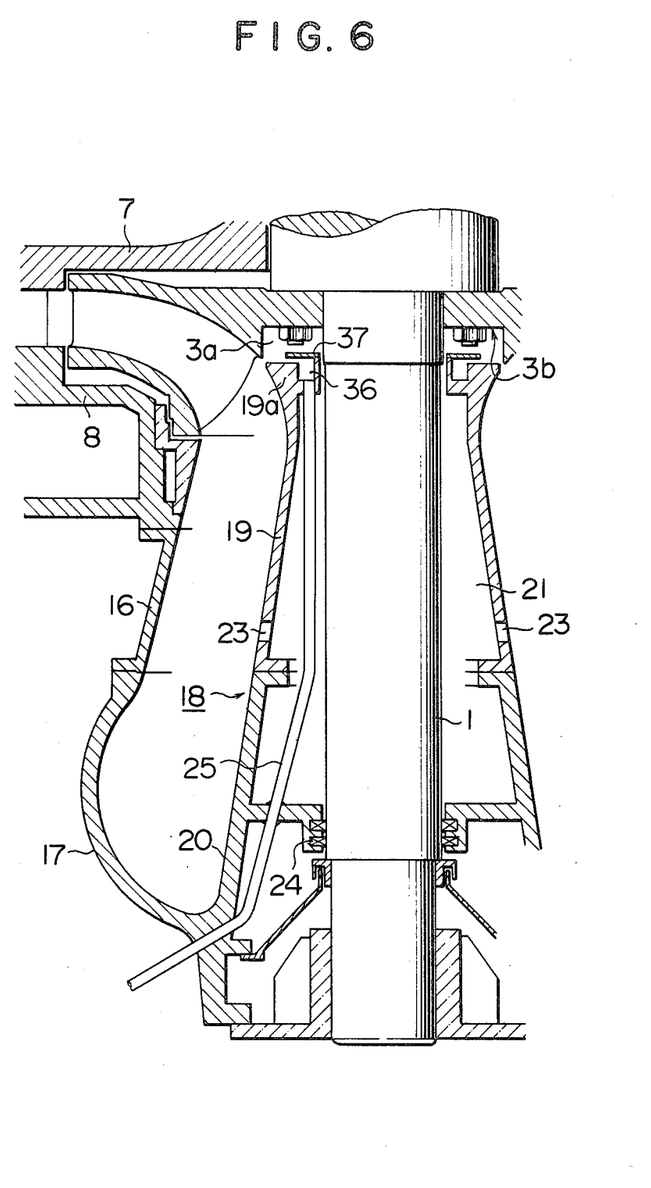
FIG. 6 is a vertical sectional view, in a much enlarged scale, of a modification of the first embodiment of the present invention.

A modification of the present invention is illustrated in FIG. 6. In this modification, an annular groove 36 is formed in the upper end 19a of the upper cone member 19 extending into the annular recess 3b. The air exhaust pipe 25 is extended so that the upper end thereof opens in the annular groove 36. A cover plate 37 is provided for the annular groove 36 so as to overlie the opening of the air exhaust pipe 25 with a small spacing.

With the above described arrangement, the upper end of the pipe 25 is not immediately closed even in a case where the water level within the upper cone member 19 goes up to the air exhausting region 3a. Furthermore, since the groove 36 is provided along the entire circumference of the upper cone member 19, exhausting of air entering into the air exhausting region 3a can be assured.

Figure 7:
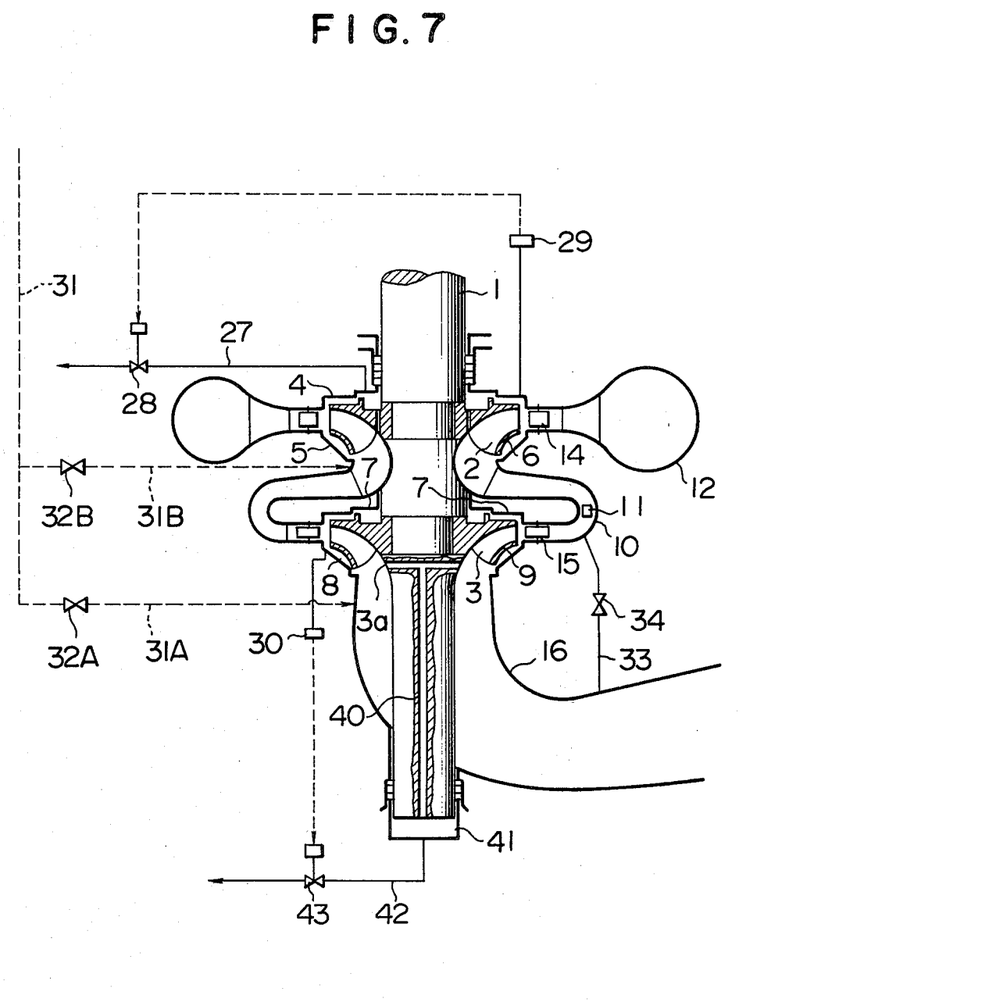
FIG. 7 is a vertical sectional view of a second embodiment of the present invention.

Another embodiment of the invention also applicable to a multistage pump-turbine is illustrated in FIG. 7. For simplifying the description, the number of the pressure stages is selected to be two. Furthermore, in FIG. 7, members and parts similar to those indicated in FIGS. 1 through 6 are designated by like reference numerals.

In this embodiment too, a high-pressure stage runner 2 is encased in a chamber 6 defined by an upper cover 4 and a lower cover 5, while a low-pressure stage runner 3 is encased in a chamber 9 defined by upper and lower covers 7 and 8. The runners 2 and 3 are mounted on the main shaft 1 of the pump-turbine in a spaced apart relation along its length. A return passage 10 having stationary vanes 11 interconnects the chambers 6 and 9, and a spiral casing 12 connected with a penstock (not shown) is provided radially outwardly of the chamber 6. Adjustable wicket gates 14 and 15 are provided as in the first embodiment for the high-pressure stage runner 2 and the low-pressure stage runner 3, respectively. A wicket gate operating mechanism (not shown) is provided for operating the wicket gates 14 and 15 independently from each other.

The lower end of the chamber 9 encasing the low-pressure stage runner 3 is coupled with a draft tube 16 of an elbow shape, which emerges into a tailrace (not shown).

The upper portion of main shaft 1 extending through the central portion of the draft tube 16 is connected with the runner-cone portion of the low-pressure stage runner 3 mounted on the main shaft 1.

According to the characteristic feature of this embodiment, an air exhausting passage 40 is formed longitudinally through the main shaft 1. The upper end of the passage 40 opens in an air exhausting region 3a in the runner-cone portion of the runner 3. An air exhausting chamber 41 is provided downwardly of the main shaft 1 in communication with the air exhausting passage 40. An air exhaust pipe 42 having a valve 43 is extended outwardly from the chamber 41.

An air exhaust pipe 27 having a valve 28 is provided through the upper cover 4 of the chamber 6 encasing the high-pressure stage runner 2. Pressure-sensitive relays 29 and 30 are also provided as in the firstmentioned embodiment. The relays 29 and 30 deliver output signals to close the valves 28 and 26, respectively, when the relays detect establishment of priming pressures at the discharge sides of the runners 2 and 3 as the pump-turbine is operated in a pumping mode.

Compressed air supply lines 31A and 31B branched out of a source line 31 are connected to an upper portion of the draft tube 16 and an intermediate portion of the return passage 10, respectively. Valves 32A and 32B are also provided in the compressed air supply lines 31A and 31B. A water draining pipe 33 is provided as in the first embodiment between the return passage 10 and the draft tube 16 having an elbow shape. A normally closed valve 34 is provided in the pipe 33.

The operation of the embodiment shown in FIG. 7 is quite similar to that of the first embodiment of the invention.

In the pumping mode of operation, the wicket gates 14 and 15 are completely closed, and compressed air is supplied through the pipes 31A and 31B into the return passage 10 and the draft tube 16, while the valves 28 and 43 are closed and the water draining (or drainage) valve 34 is opened.

When the water levels in the chambers 6 and 9 are sufficiently lowered, the valves 32A and 32B are closed, and the runners 2 and 3 are rotated in the pumping direction within the compressed air. When the rotating speed of the runners increases to the synchronous speed, the valves 28 and 43 are opened for exhausting compressed air. The water levels in the chambers 6 and 9 are thus elevated, until portions of water caught by the runners are shifted by centrifugal force outwardly. At last the chambers 6 and 9 are filled with water, and when priming pressures are established at the discharge sides (in pumping operation) of the runners 2 and 3, the pressure relays 29 and 30 close the air exhausting valves 28, 43 and the water draining (or drainage) valve 34. Upon confirmation of the closure of the valves 28, 43 and 34, the wicket gates 15 for the low-pressure stage runner 3 and then the wicket gates 14 for the high-pressure stage runner 2 are automatically opened for operating the pump-turbine in the pumping mode of operation.

In the last stage of the above described air exhausting operation, however, there is a tendency of compressed air remaining in the upper central portions of the chambers 6 and 9. According to the present embodiment, the air remaining in the upper central portion of the chamber 9 can be exhausted effectively through the air exhausting region 3a, the air exhausting passage 40 formed through the main shaft 1, the air exhausting chamber 41 provided downwardly of the main shaft 1, and the valve 43 now opened.

Although the invention has been described with respect to a pump-turbine having two pressure stages, it is apparent that the invention is applicable to a multistage reversible pump-turbine set having three or more pressure stages without departing the scope of the present invention. Furthermore, the invention is applicable to a multistage hydraulic machine operable as a multistage hydraulic pump.

We claim:

1. In a multistage hydraulic machine comprising a number of pressure stages each including a runner, a main shaft supporting the runners ranging from a highest pressure stage to a lowest pressure stage, a number of return passages each interconnecting an adjacent pair of the pressure stages, at least one set of adjustable wicket gates provided for the highest pressure stage runner, a draft tube connected beneath the lowest pressure stage, and means for supplying and exhausting compressed air into and out of the pressure stages upon closure of the adjustable wicket gates: the improvement comprising an air exhausting device which includes a draft cone provided internally of said draft tube for encircling said main shaft, and an air exhaust pipe provided internally of said draft cone to extend upwardly through a space between said draft cone and said main shaft, an uppermost end of said air exhausting pipe opening in an air exhausting region formed in a runner-cone portion of the lowest pressure stage runner, and another end portion of said air exhaust pipe extending to outside said machine through a lower portion of said draft cone.

2. A multistage hydraulic machine as set forth in claim 1 wherein said air exhausting region is defined by an annular recess opening downwardly and provided in the runner-cone portion of the lowest pressure stage runner, and by an upper end of the draft cone extending upwardly into said annular recess.

3. A multistage hydraulic machine as set forth in claim 2 wherein an annular groove is further provided in the upper end of said draft cone extending upwardly into said annular recess, and said air exhausting pipe opens in said annular groove.

4. A multistage hydraulic machine as set forth in claim 3 which further comprises a cover plate for the annular groove provided to overlie an upper end of said exhaust pipe.

5. In a multistage hydraulic machine comprising a number of pressure stages each including a runner, a main shaft supporting the runners ranging from a highest pressure stage to a lowest pressure stage, a number of return passages each interconnecting an adjacent pair of the pressure stages, at least one set of adjustable wicket gages provided for the highest pressure stage runner, a draft tube connected beneath the lowest pressure stage, and means for supplying and exhausting compressed air into and out of the pressure stages upon closure of the adjustable wicket gates: the improvement comprising an air exhausting device having an air exhausting passage formed internally through said main shaft to extend upwardly, an uppermost end of said air exhausting passage opening in an air exhausting region formed in a runner-cone portion of the lowest pressure stage runner, and another end of said air exhausting passage opening in an air exhausting chamber provided below the main shaft.

* * * * *